Dec. 23, 1930.  A. DEFOUR  1,785,896
METHOD OF UTILIZING THE TIDES FOR POWER PURPOSES
Filed Aug. 13, 1926   3 Sheets-Sheet 1

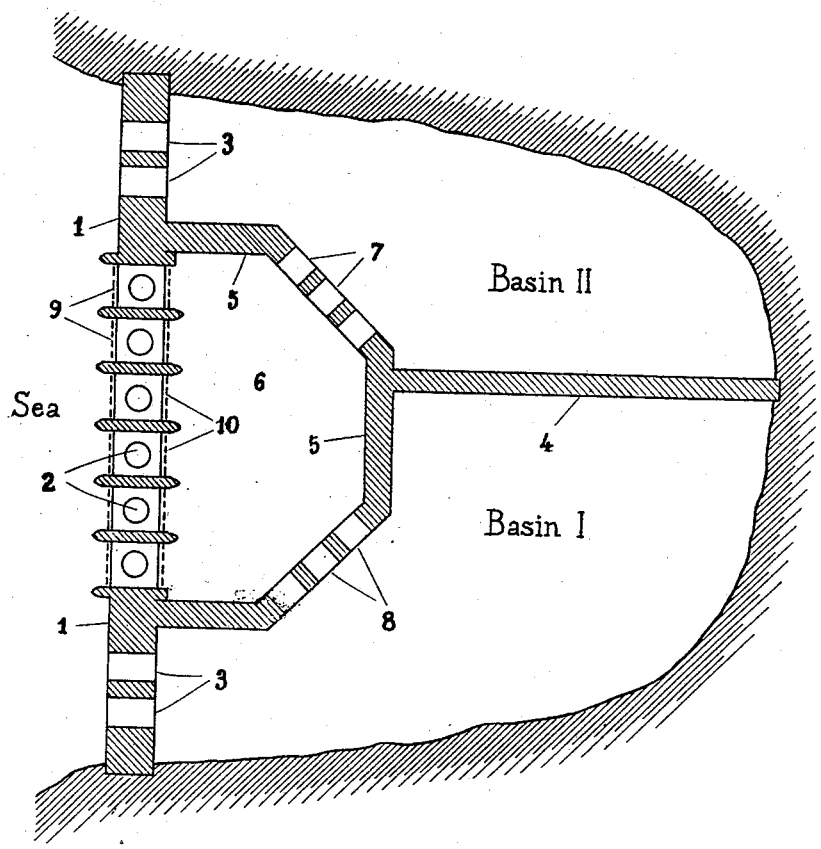

Patented Dec. 23, 1930

1,785,896

UNITED STATES PATENT OFFICE

ANDRÉ DEFOUR, OF PERONNE, FRANCE

METHOD OF UTILIZING THE TIDES FOR POWER PURPOSES

Application filed August 13, 1926. Serial No. 129,069.

This invention relates to a method of utilizing the tides for power purposes.

Numerous methods of utilizing tidal energy have already been proposed.

The present invention permits of continuous distribution of the energy developed independently of variations of the course of the tides by virtue of the employment of two connected reservoirs or basins at different levels as explained below.

When the sea level is above its mean position, water flows from the sea to the first basin, i. e., the basin I, so long as the head or difference of level exceeds a certain value, the water flowing into this basin being allowed to do work.

When the difference of level falls below this value, by operation of a sluice, water accumulated at the time of the preceding full tide in a second basin II at higher level than the basin I and of a capacity about one half that of the basin I is permitted to flow towards the sea, doing work. This flow continues until the sea level, continuing to fall, is sufficiently low for the basin I to be able to return to the sea, with sufficient head, the water which it has previously received and the water accumulated while basin II was discharging.

Then the water in basin I is caused to flow towards the sea, doing work, until the difference in level falls below a certain value. Then the flow from the basin II to the sea recommences, while the level in basin I falls to its point of low level; then the flow from the sea towards the basin I recommences as soon as the sea level is sufficiently high and the cycle is repeated.

The invention permits the selection of levels of the two basins according to circumstances in such wise that depending on the power of the turbines to be driven by the flowing water and of the orifices there may be made available any amount of energy required.

The arrangement of the turbines will depend on the size of the installation, the output being determined by adjustment of sluices.

In the accompanying drawing which illustrates the invention Fig. 1 is a diagram illustrative of the conditions during ebb and flow with a spring tide. The abscissæ are proportional to the times and the ordinates are proportional to the heights or levels. Figs. 2, 3 and 4 are analogous diagrams for different tides and Fig. 5 is a schematic plan view of one arrangement of basins for carrying out the present invention.

In Fig. 1 the line A, B, C, D represents the variation of the level of the sea. The axis S T represents its mean level.

The line E, F, G, H, I, J, K represents the variations of the level of the water in the first basin and the line L, M, B, N, O, P, Q, R represents the variations of the level of the water in basin II with the same system of co-ordinates.

The heavy lines E F, and H I correspond to the working phases of the basin I and represent the variations of level of the water in this basin during the times represented.

The heavy lines N O and P Q similarly correspond to the working phases of the basin II.

The dotted curves F G and I J correspond respectively to the filling and to the emptying of the first basin with free flow and the dotted lines G H, J K, B N, O P, and Q R or L M correspond to the periods of slack water in the basins.

The vertical hatch lines indicate the flow of water through the turbines with development of energy.

A complete period is comprised between the ordinates L E, and Q K.

Starting from L E it will be seen that the flow to the basin I from the sea is effected until the ordinate F N is reached, the level B N being established in the basin II. Starting from F N, flow takes place from the basin II towards the sea while in the basin I the level is at G H. At H energy is again furnished by the basin I, the water in which flows towards the sea, while the basin II is idle at the level O P. This state of things continues until the ordinate I P is reached. From this point the basin II furnishes energy and the water therein flows towards the sea while the basin I empties until the level J K is reached.

When the sea level has risen, i. e., at the ordinate Q K, the flow is again to the basin I from the sea while the basin II remains idle at the level Q R, being filled at high tide to the maximum level B N when the cycle recommences.

The heavy lines E F, N O, H I, and P Q corresponding to the variations of the level in the reservoirs during the working phases have been drawn as representing the utilization of an invariable quantity of energy during one tide. However, to answer local requirements, not only may the times for the working phases be varied but also conditions may be modified in such manner that the contours of the curves in question would be different.

Figure 1:
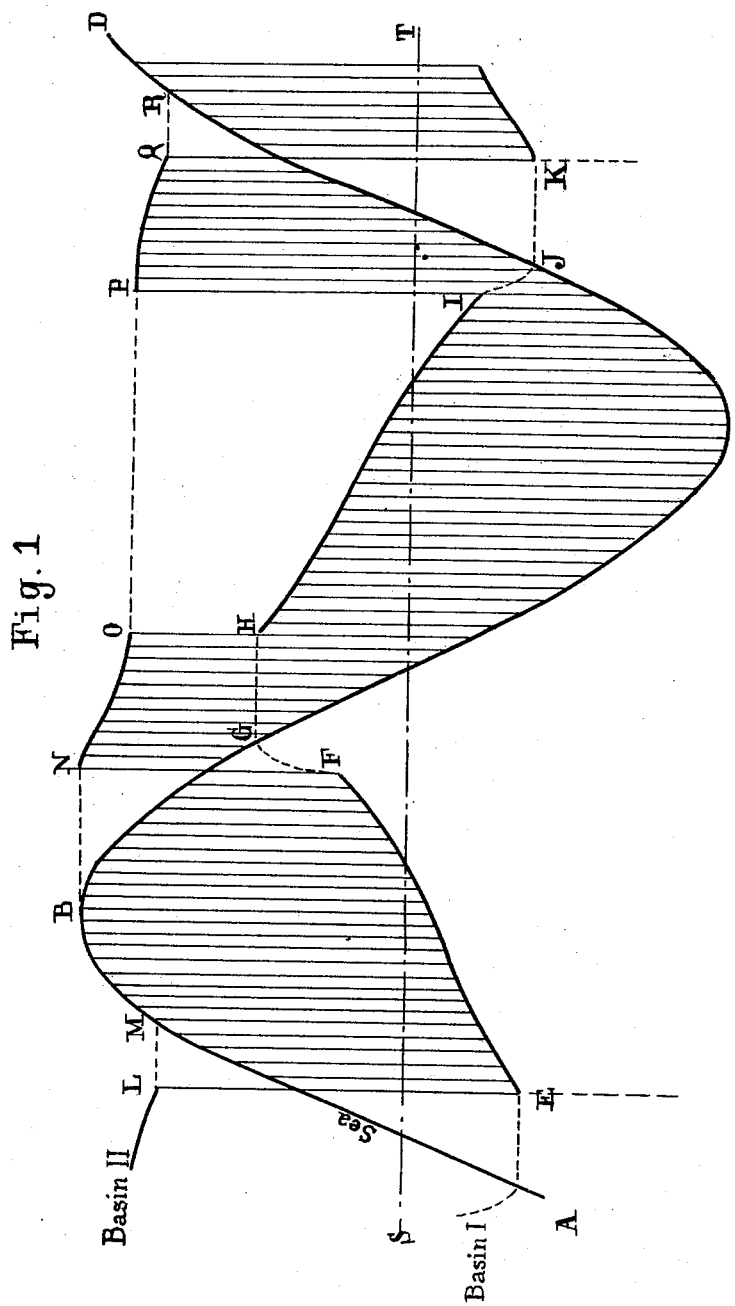
Figure 2:
Fig. 2 represents a diagram illustrative of the conditions during a neap tide.
Figure 3:
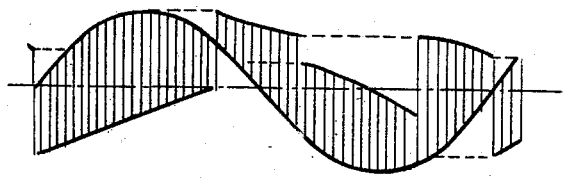
Figs. 3 and 4 represent the conditions for tides of intermediate amplitudes.
Figure 4:
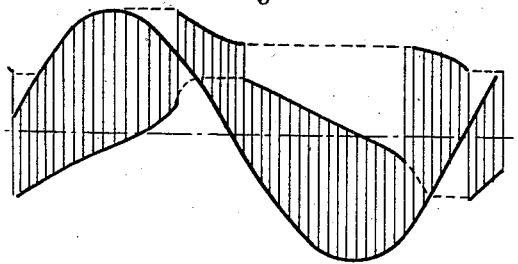

It is understood that although very different as regards respective duration of each phase of lay-outs selected for the purpose of diagrammatic illustration are adapted to give regular output of power in the course of a tide while maintaining the same proportions of the contents of the basins.

The curves represented in the several figures only differ as regards height and not as regards time, the difference in duration of tides of different amplitude being neglected to facilitate comparison and this difference being without practical importance.

The height or level of the first reservoir may be varied without detraction from the advantages above mentioned.

The cycles given by way of example may be readily adapted to actual sea basins without incurring the expense of dredging.

However, when bays or the like utilized as basins are not subject to being filled with sand or the like and when it is desired to recover a maximum energy even at the risk of being less in accordance with local requirements and to obtain with neap tides a fall proportionally less there may be employed a variant according to which the filling of the basin I is effected at the moment of slack high water and the emptying at the moment of slack low water. The basin II in lieu of being operative only during emptying may then be used to give out work like the basin I both during filling and during emptying.

This variation may be adopted without modifying the proportions of the two basins.

In this figure, the dike 1 separates the sea from the whole of the basins I and II and it comprises in its central part the rooms for the turbines 2 and at its extremities the sluices 3 which permit of the communication of basins I and II with the sea according to the needs.

These basins are separated one from the other by a dike 4; they are also separated from the turbine's-rooms by a dike 5 which insulates an auxiliary basin 6. But this dike 5 is provided with vanes 7 and 8 allowing of the communication, at will, of any one of the basins I and II with the basin 6.

On the other hand, the vanes 9 and 10 allow of the communication of the turbine's rooms, at will with the basin 6 or with the sea.

It will be seen that the series of watergates or vanes illustrated in Fig. 5 makes possible the utilization of the various expected tidal flows.

What I claim is:—

1. A method of utilizing the tides for power purposes consisting in permitting water to flow between the sea and two connected basins at different levels, utilizing the flow of water from the sea to the basin at lower level and from the basin at lower level to the sea for development of power and utilizing flow of water from the basin at higher level to the sea for development of power during all times that water flowing between the basin at lower level and the sea is idle.

2. A method of utilizing the tides for power purposes consisting in permitting water to flow from the sea to a basin during such time as the sea level is higher by a predetermined extent than the level in said basin while utilizing the said flow for development of power, then permitting water to flow from a basin at higher level than the first basin to the sea, while utilizing such flow for power development and discontinuing the use for power development of flow from the sea to the first basin, until the level in the first basin is higher than the sea level to the said predetermined extent, then permitting water to flow from the first basin to the sea while utilizing such flow for development of power until the difference in level between the first basin and the sea falls below said predetermined extent, then permitting water to flow from the second basin to the sea while utilizing such flow for development of power until the initial point of the cycle is reached.

In testimony whereof I have signed my name to this specification.

ANDRÉ DEFOUR.